Aug. 14, 1928. 1,680,779
J. C. FREEMAN
BREAD SPLITTING MACHINE
Filed Jan. 25, 1926 6 Sheets-Sheet 3

Inventor
J.C.Freeman,
By
Connell & O'Connell
Attorneys

Aug. 14, 1928.

J. C. FREEMAN

BREAD SPLITTING MACHINE

Filed Jan. 25, 1926

Inventor
J.C.Freeman,

Attorneys

Patented Aug. 14, 1928.

1,680,779

UNITED STATES PATENT OFFICE.

JOHN C. FREEMAN, OF JEFFERSONVILLE, INDIANA.

BREAD-SPLITTING MACHINE.

Application filed January 25, 1926. Serial No. 83,552.

My invention relates to improvements in machines designed for splitting the top of a dough loaf, after proofing and before baking, to facilitate the expansion of the gas cells whereby to obtain a thorough and uniform baking, and the objects of my improvement are:

First: To save time and labor in the operation of the machine and to prevent damage to the pans and dough.

Second: To afford proper facilities for instantaneously adjusting the machine to different lengths and depths of cut, to heights of pans, and for different size loaves.

Third: To make the incisions in such manner as to prevent destroying or breaking down the interior cells and to allow the heat to penetrate the center of the dough loaf, thereby baking thoroughly and uniformly.

Fourth: To save power and to lessen the pecentage of deterioration, yet maintaining a uniformly optimum result.

I attain these objects by the mechanism illustrated in the accompanying drawings, in which Figure 1 is a top view of the machine.

Figure 8 is an enlarged detail view of one of the disc-shifting members.

Figure 4:
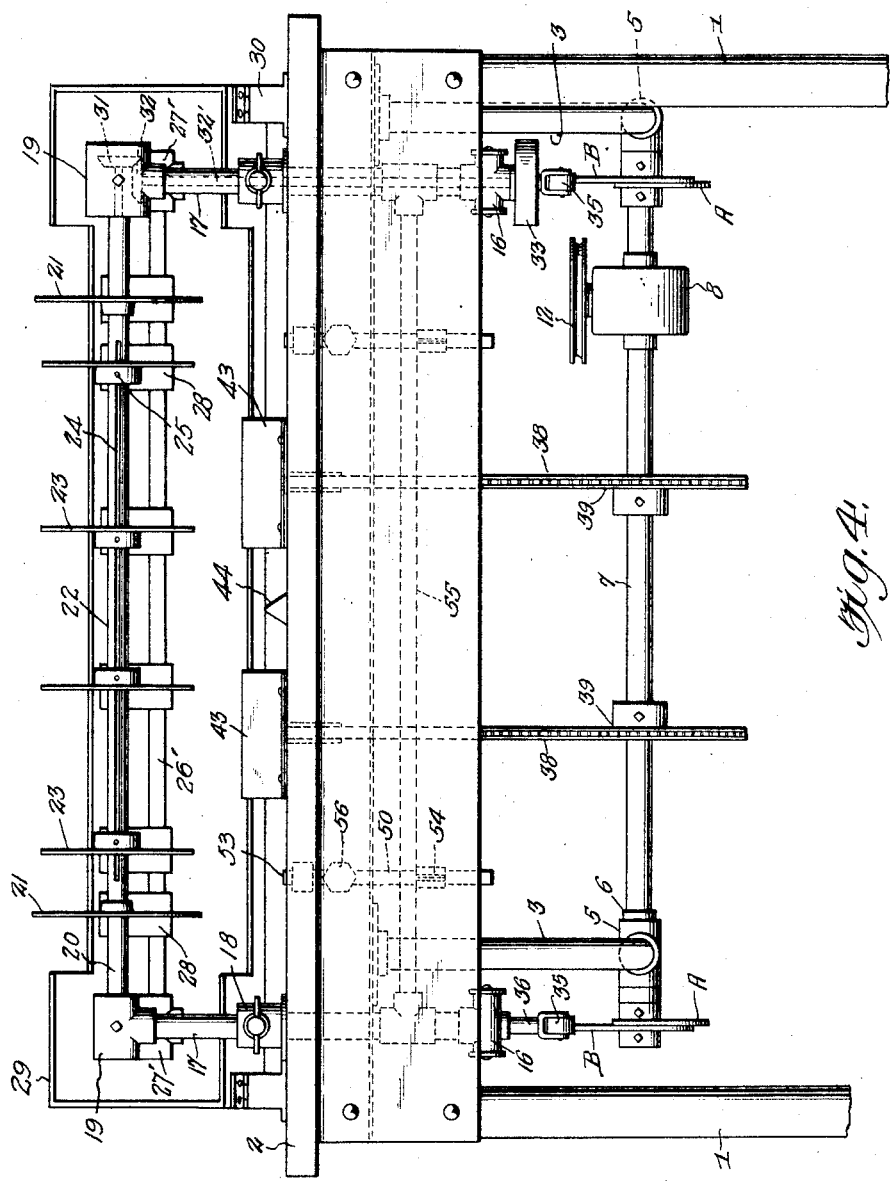
Figure 4 is a front elevation.

This machine comprises a portable table consisting of the legs 1 supporting a metal top 2 having angle iron reinforcements to prevent vibration. Suitably secured to the under side of the table top and spaced inwardly from the table sides is a hanger frame comprising two main bridge hangers 3 made of tubing and connected by a tie bar 4. This hanger frame carries in its bridge line construction and near its inner end, two bearing holders 5 in which are engaged the adjustable shaft bearings 6, (see Figure 4), supporting the end of a main power shaft 7. This shaft includes in its direct line a worm gear reduction 8, the gear case of which is clamped to the tie bar of the frame, as shown at 9. The main power shaft is driven from the gear reduction, which is operated direct from a motor 10, this latter being suitably mounted at the outer end of the hanger frame. This motor is equipped with a belt drive 11 leading to a belt pulley 12 mounted on the worm gear pinion shaft of the gear reduction.

Within the bounds of the hanger frame lies a horizontal rocker frame constructed of tubing and embodying two side elements 13 and a connecting element 14. This rocker frame is fulcrumed at the rear of the hanger frame, as shown at 15, and is connected at the inner end by tubular wrists or knuckles 16 to the vertical stems 17 of the disc frame. Stems 17, which are also constructed of tubing, operate through guide tubes 18 bolted to the table top and serving to hold the stems in strict vertical movement. At the top of each stem is a bearing bracket 19, in which is mounted an adjustable bearing 20, which bearings extend a suitable distance inwardly of the brackets for the purpose of carrying each an idle guard disc 21. Working in the bearings is a disc shaft 22 carrying cutting discs 23 to the number required. The guard discs 21 are slightly larger than the cutting discs 23, and revolve loosely on the shaft bearing, being designed for the purpose of protecting the cutting discs from damaged pans. In the adjustment of the machine, the guard discs are set so as to just ride on the inside of the outer ends of the dough pan and do not displace the dough loaf while each cutting disc 23 is centered with respect to the dough loaf it is intended to split. The disc shaft has a small groove or keyway 24, extending from end to end to allow easy adjustment of the discs for different sized pans, and the disc collars have screw pins 25, serving as keys, working in the shaft keyway.

Figure 1:
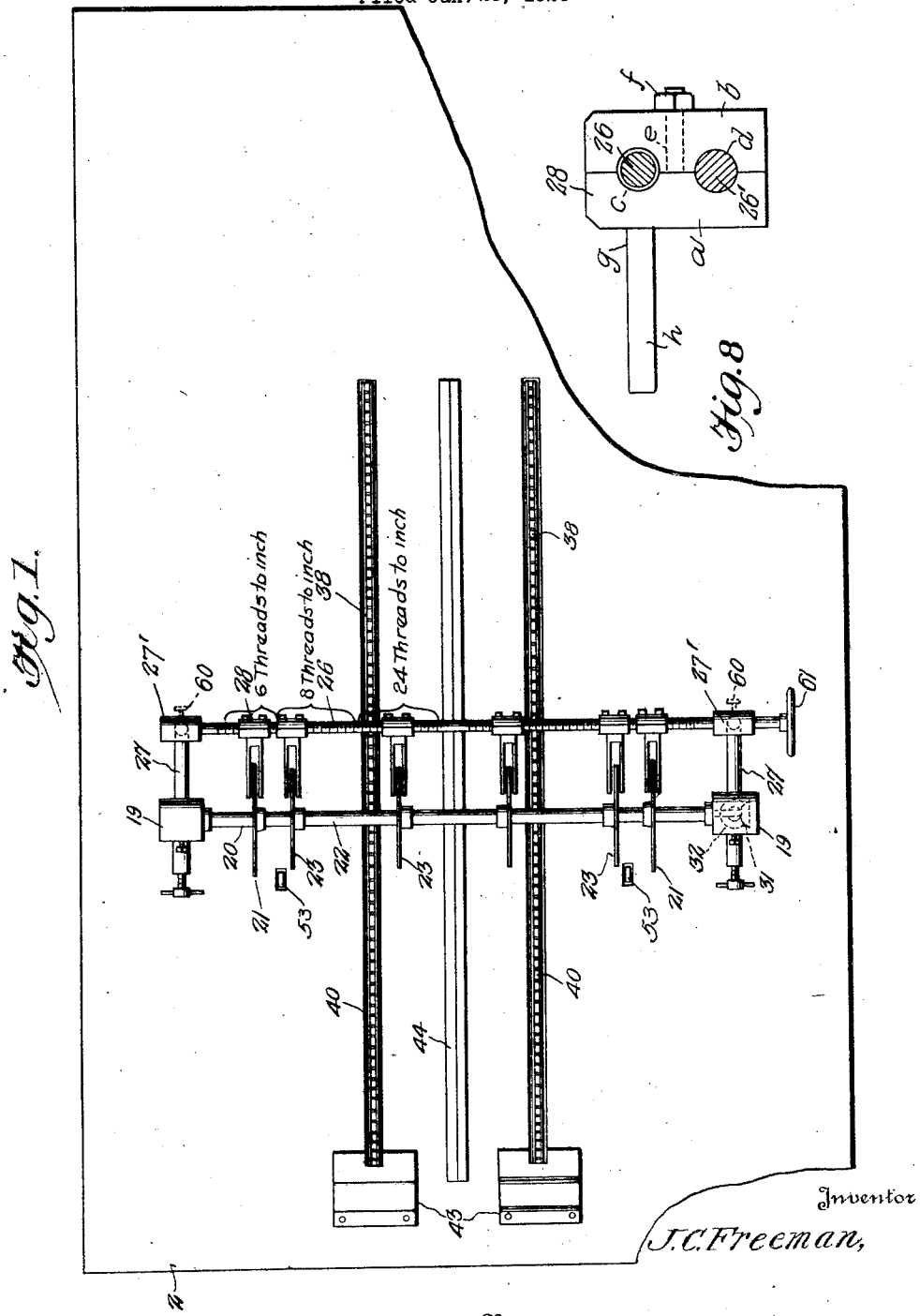
Figure 5:
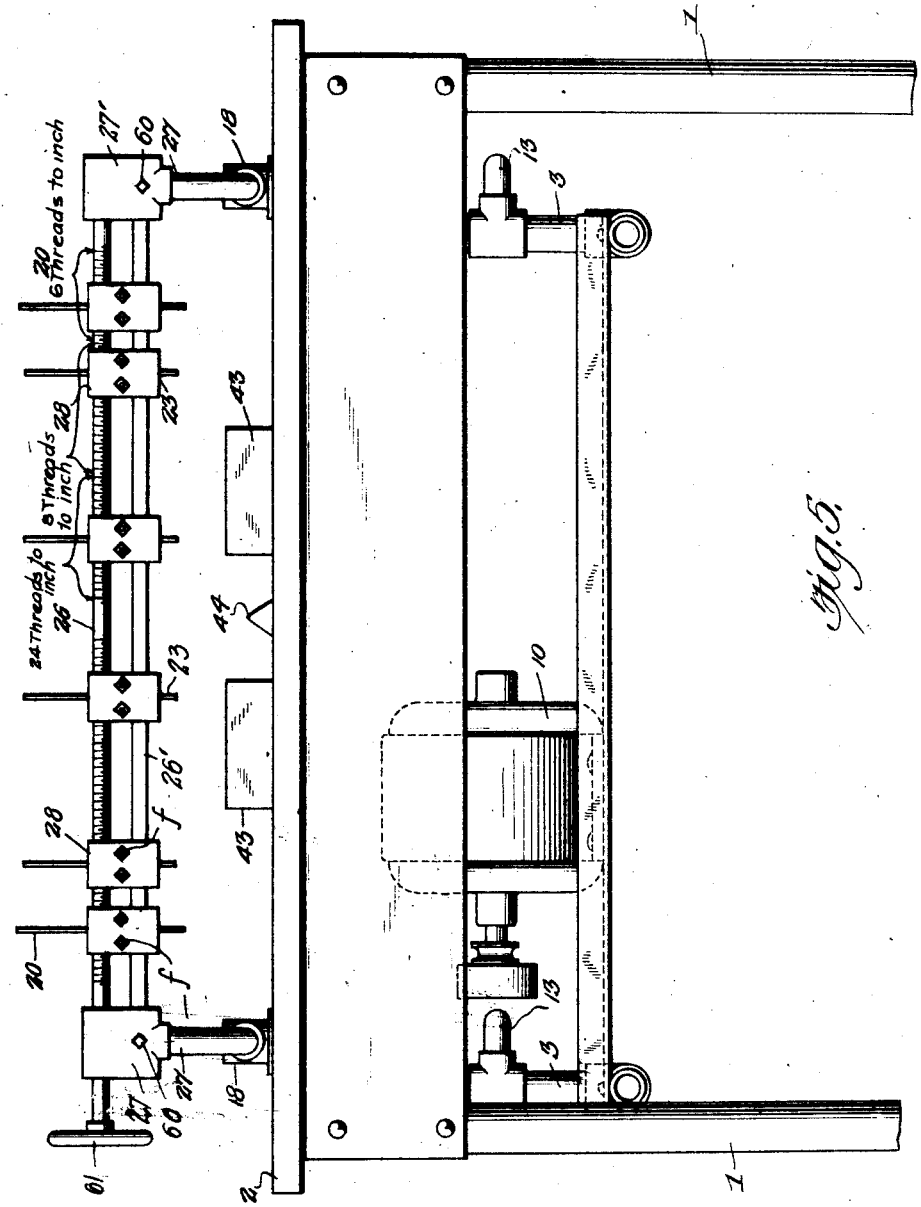
Figure 5 is a rear elevation.

The means for adjusting the discs with reference to different sized pans embodies a differentially threaded bar 26 arranged behind and on a horizontal line with the disc shaft 22. As shown in Figures 1 and 5, the threaded bar 26 has right and left hand groups of threaded sections, the threaded sections of each group being of different pitch, the pitch of similar sections of each group being the same but opposite in direction. Directly below and spaced from the threaded bar 26 is a stationary guide rail 26′, the ends of which are secured in bearings 27′ by means of set screws 60. Bearings 27′ are mounted on brackets 27 and also serve to support the threaded bar 26 which is adapted to be turned by means of a handwheel 61. Associated with each threaded section of the threaded bar 26 is a disc-shifting member 28 composed of half sections $a$ and $b$ having their contacting faces suitably recessed to provide upper and lower openings $c$ and $d$ to accommodate the threaded bar 26 and the guide rail 26' respectively. The upper opening $c$ has a screw thread of the same pitch as the threaded section of the bar 26 with which it is associated. Section $a$ has one or more pins $e$ adapted to extend through section $b$ and threaded to receive a nut $f$ for securing the sections together. Projecting from the front face of section $a$ is a forked element $g$ having two prongs or fingers $h$ between which is positioned a disc 21 or 23. Upon turning the differentially threaded bar 26, the disc-shifting members grouped on one side of the bar, and hence the discs actuated thereby, will be moved simultaneously with the disc-shifting members and discs grouped on the other side of the bar, the movement of similar units of each group being opposite in direction. The operation is performed at a speed ratio which centralizes the discs with reference to different sized pans. For example, assuming that the pitch ratio of the threaded sections of each group is as indicated in the drawings, namely, 6, 8 and 24, should the machine be set for a certain size four-loaf pan and it is desired to use a set of four-loaf pans one-half inch larger, the inner set of cutting discs 23 working on a No. 24 thread must each move in opposite directions one-sixteenth of an inch. This calls for one and one-half turns of the threaded bar 26. The cutting discs 23 of the outer set working on a No. 8 thread move in opposite directions three-sixteenths of an inch with the one and one-half turns of the threaded bar. The guard discs 21 working on a No. 6 thread will move one-quarter of an inch in opposite directions with one and one-half turns of the threaded bar. This adjustment of the discs can be made in a few seconds and enables the operator to maintain accurate central splitting of the loaves.

Figure 2:
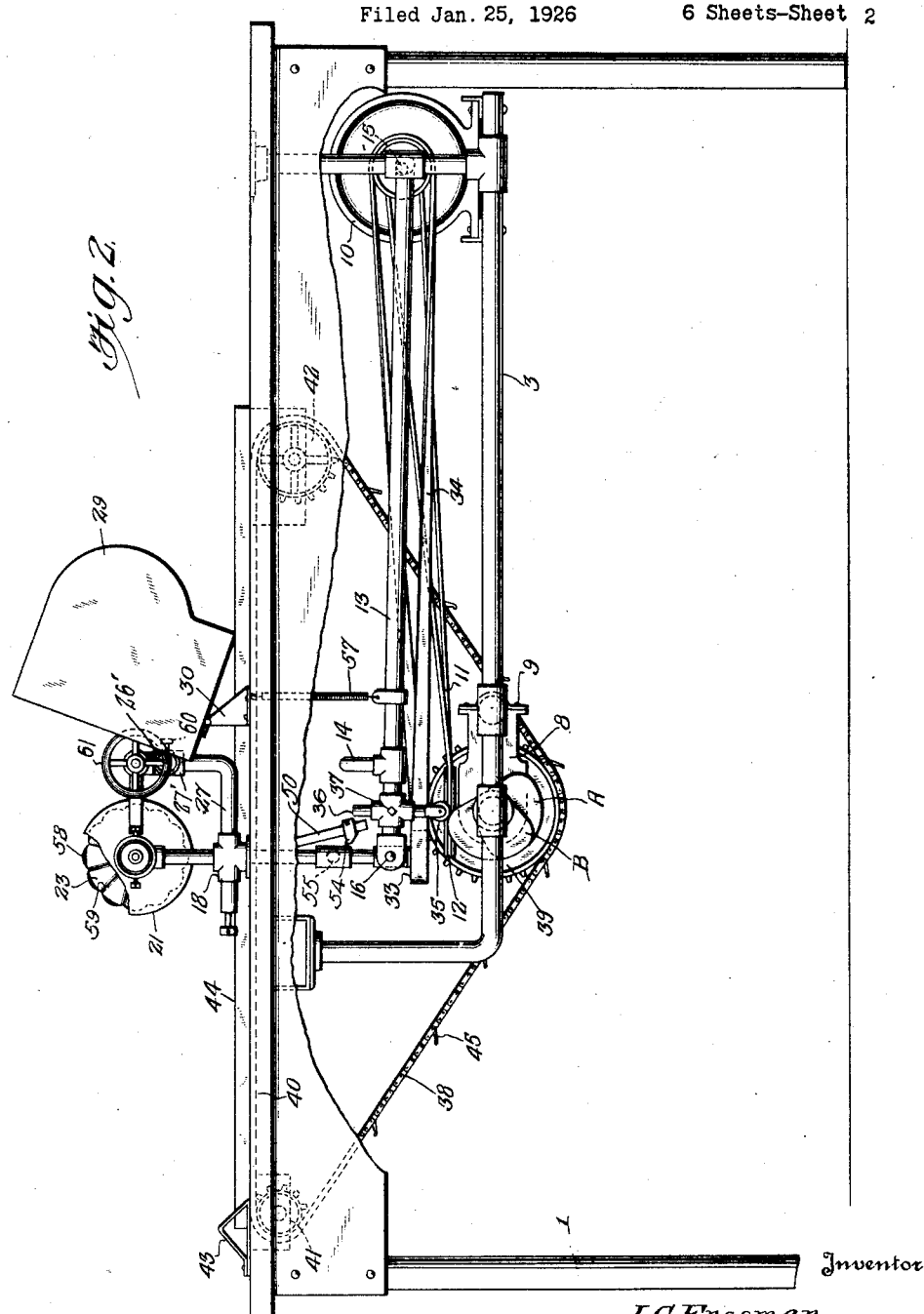
Figure 2 is a side elevation thereof.
Figure 3:
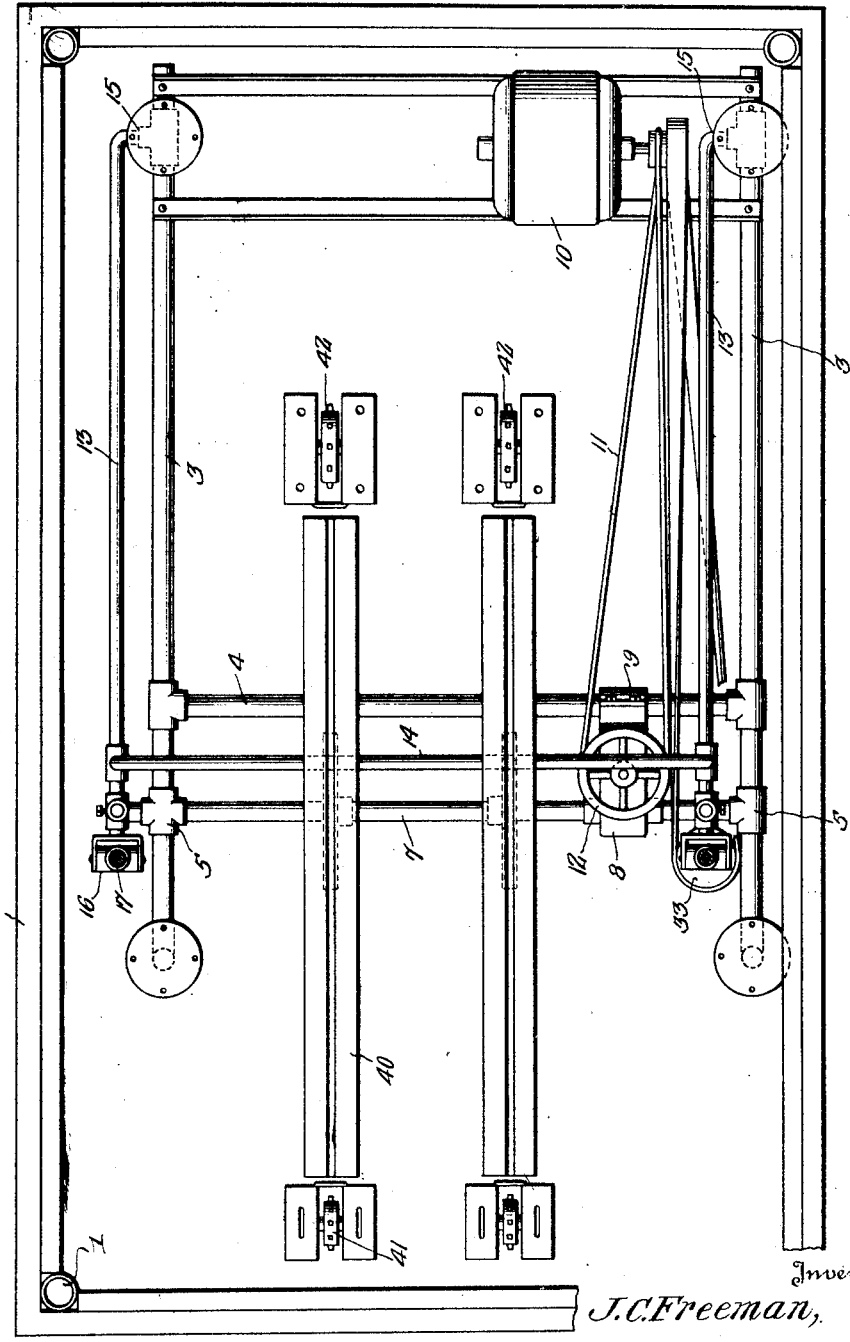
Figure 3 is a plan view with the table top removed.

The discs, shafting, and disc-adjusting means are adapted to be covered, during the operation of the machine, by a protecting hood 29 which shields the running parts from injury. This hood is hingedly mounted on brackets 30 in the rear of the adjusting means and is adapted to be swung back, as shown in Figure 2, whenever it is desired to uncover the parts.

On the right-hand end of the disc shaft and enclosed in the bearing bracket at that end, is a bevel gear 31 in mesh with a bevel gear 32 on the upper end of a gear shaft 32'. This shaft extends downwardly on the inside of the stem and passes through the knuckle joint 16, having on its lower end a small pulley 33 which is connected by belt 34 direct to the motor 10. To provide for the raising and lowering of the rocker frame, the power shaft carries at each end a compound cam, and working with and above each cam is a roller 35 carried by a stem 36 adjustably mounted in the rocker frame, as shown at 37. The cams are respectively formed of two separate pieces or half sections, A and B, each with a special profile to cause a proper vertical action of the rocker frame. These compound cams work side by side and can be adjusted by expanding or closing to provide for different lengths of cuts, and the height and depth of cuts can be regulated by adjustment of the roller stem.

Figure 7:
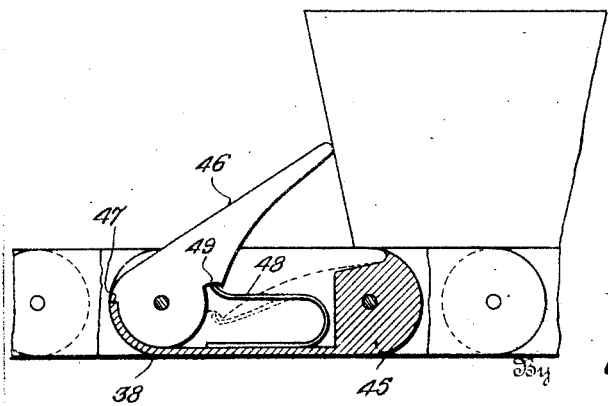
Figure 7 is an enlarged detailed view of the automatic links.

The pans are carried toward the cutting discs by a pair of endless feed chains 38 propelled by driving sprockets 39 mounted on the main power shaft 7. These chains travel in grooves or guides 40 in the table just below the top surface, running over stationary idlers 41 at the front table end and then backward and over stationary idlers 42 at the rear, returning to the driving sprockets. At its front terminal, each chain guide or groove is spanned by a guard or housing 43, and between the grooves is arranged a center guide 44. One center guide is used for a four-loaf pan and two center guides for a five-loaf pan. But these center guides need not be changed, however, for different width pans. For the purpose of rectifying much ill-time feeding, the feed chains are provided with special automatic links 45 uniformly placed to carry the pan toward the cutting discs in time with the action of the cams, and these attachments are set in such time that whatever length pan is used, the front end of the pan is passing the vertical central line of the disc just as the discs begin their downward movement. Thus:—If a twelve inch pan is to be used, the space between the attachment links and the vertical central line of the discs must be twelve inches, and the sections A of the compound cams must be set to begin lowering the discs into the pan. As the back of the pan approaches the discs sections B of the compound cams is set to raise the discs up and above the edge of the pan. As shown in Figure 7, each attachment link is made with a channel body having a tripper tongue 46 pivoted at one end and normally maintained at an upward position of 45 degrees by a small heel 47 at the bottom of the tongue and a small V-shaped spring 48 lying in the bottom of the channel body and engaged with a notch 49 in the tongue. Should a pan be placed or dropped on top of the automatic links, it will have been placed ill-timed, or too late, because the pan must be in front of the link to be in time with the downward movement of the disc. If these attachments were links with stationary upright lugs and the pan would be placed or dropped on top of the lugs, the latter, having the weight of the pans on themselves rather than on the table, would carry the pans out of time in a twisted position toward the already descending discs, thereby causing a jam and delay as well as damage to the cutting edges of the discs. But with the automatic attachment links, the pan happening to top the link will close the latter and rest stationary on the table. The closed link, being slightly lower than the top of the table, passes freely from under the pan, reopens itself and passes onward, while the succeeding set of automatic links will approach the back of the pan and push the same in proper time toward the disc. In feeding a chain with a stationary attachment link, the operator loses much time and is under strain in watching the chains so as to set the pan in the right place—thus causing slow feeding. In feeding this machine with the automatic attachment links, the operator can set the pan on the table at any time and at any place between the disc and the front end of the table and give most of his attention to getting the pans to supply the machine. Hence, this arrangement permits a more perfect feeding on the high speed basis for which this machine is constructed.

Figure 6:
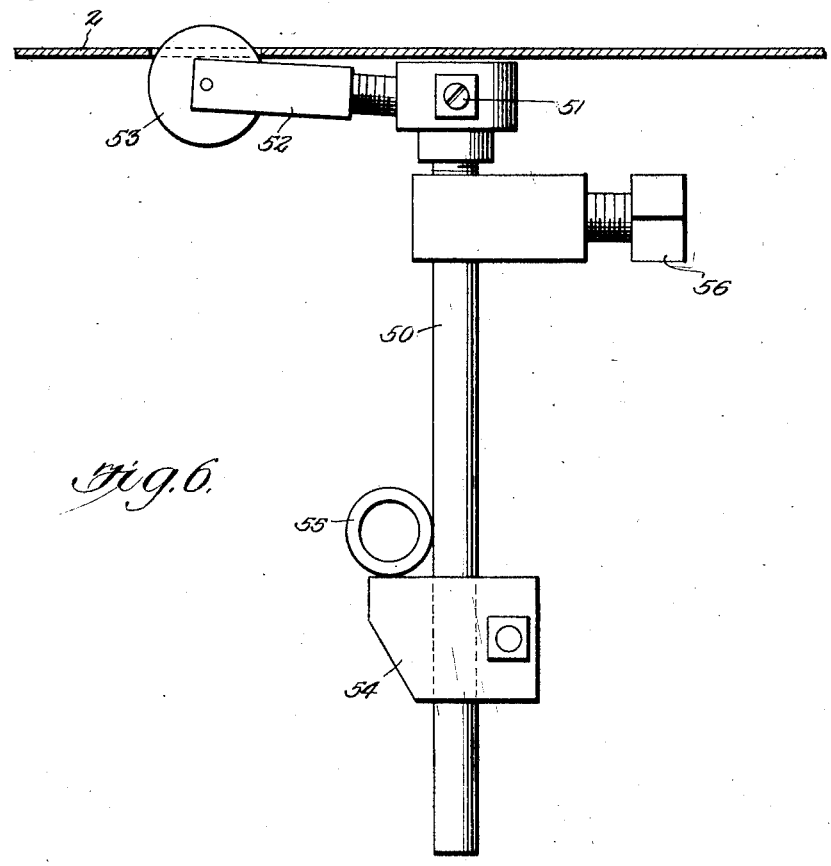
Figure 6 is an enlarged detailed view of the locking mechanism.

To save power and wear by unnecessary action and exposure of discs when running without feeding, a special automatic locking attachment such as is shown in Figure 6 is provided. This comprises a pair of locking devices each of which embodies a lever 50 acting as a right angle lever, fulcrumed on a pivot 51 supported from the under side of the table top and in advance of the cutting disc. The horizontal arm 52 of the lever has on its outer end a roller 53 which appears through and just above the top surface of the table and in front of the line of discs. The vertical arm of the lever has mounted thereon near the lower end an adjustable catch 54, which catch is adapted to be engaged under bar 55 to intercede the downward movement of the disc shaft. Bar 55 connects the stems 17 of the disc frame and serves as a stiffener for the said frame as well as a keeper for the automatic locking device. When a pan moves toward the discs it rides over and depresses the rollers 53 of the locking levers, thereby moving the latter so that the vertical arms and catches swing back from the bar 55 and permit the downward movement of the disc frame. Should no pan be ready for action, the locking system remains closed and holds the disc shaft in an upward position. An adjustable balance weight 56 is used as an aid to close the locking bar and the rocker frame is counterbalanced near its free end by a pair of springs 57 connected to the under side of the table top. The lower edges of the stationary hood over the discs are slightly above the top of the pans and the locking devices hold the discs to such height inside the hood that the bottom edges of the discs are above the lower edges of the hood, hence out of danger from outside contact. The cutting discs are so ground as to eliminate as much as possible the sliding action of the cutting edge which tends to drag the dough. The outside edge is ground is scalloped form, as shown at 58, which allows very little of this action at the periphery, this small amount being obliterated by special ground air channels 59 extending radially of the disc on each side thereof. The air in these channels becomes so compressed by the rapid rotation of the discs as to cause the dough wall to lie back from the blade, and no grease, oil, flour, or wiping appliances are needed with these discs. These discs are so ground as to carry sufficient air to the discs and the dough to prevent sticking or pulling as occurs with the ordinary smooth blade. These cutting discs improve the appearance of the finished load by giving it a beautiful grain and shred, and the uniformity of the loaf makes perfect wrapping and consequently eliminates damage to bread and waste of wrapping paper.

In the operation of the machine, a pan is taken from the rack by the operator and placed at any time and at any place between the disc shaft and the front end of the machine. Attachment links appear from the chain housings or guards 43 at the front and push against the back of the pan, propelling same towards the already elevated discs. Nearing the discs, the pan passes over and depresses rollers 53, releasing the locking devices so that the disc shaft will be free to descend, and when the front end of the pan is directly under the vertical central line of the discs, sections A of the compound cams begin to lower the disc frame. The cam followers 35 drop to and ride the lower periphery line of the cams the full length of the pan, enabling the cutting discs to make a deep incision in each loaf from end to end. When the back of the pan approaches the discs, sections B of the compound cams then operate to elevate the discs above the edge of the pan, and when the pan has passed the rollers 53 of the levers 50, the locking devices close and hold the discs in their elevated position, ready for the next pan. The operation is then repeated.

From the foregoing it will be seen that I have provided a construction of lightness and durability, involving the least amount of working parts and having all mechanism placed well within the table lines so as to be protected from outside interference or abuse. It is to be understood, however, that my invention is not to be considered as limited to the precise details hereinbefore set forth, but that various modifications and alterations may be made with respect thereto

Having thus described the invention, what I claim as new is:

1. In a bread splitting machine, means for making an incision, conveyor means traveling in the direction of the incision-making means, means for automatically raising and lowering the incision-making means at predetermined intervals, lock means for preventing the lowering of the incision-making means at inopportune times, said lock means being set in the path of the object carried on the conveyor and adapted by contact with the latter to be automatically released.

2. In a bread splitting machine, vertically adjustable incision-making means, means for propelling a dough loaf towards the said incision-making means, locking means normally holding the said incision-making means elevated and including a trip in advance of the incision-making means adapted to be operated by the passage of the dough loaf thereover for releasing the said incision-making means so that the latter is free to descend, means for lowering the said incision-making means when the front end of the dough loaf is directly under the vertical line of the incision making means, means for elevating the said incision-making means when the rear end of the dough loaf approaches the said vertical line of the incision-making means, and means operating automatically for resetting the locking means after the dough loaf has passed entirely over the said trip.

3. In a bread splitting machine, a table, a hanger frame depending from the under side of the table top, a rocker frame fulcrumed on the hanger frame, cutting mechanism including a disc frame connected to the said rocker frame and having a vertical movement through the table top, a power shaft supported in bearings in said hanger frame, and means operated from the said power shaft for raising and lowering the said rocker frame at predetermined intervals.

4. In a bread splitting machine, a table, a hanger frame depending from the under side of the table top, a power shaft at one end of the hanger frame, a motor at the other end of the hanger frame having a driving connection with the said shaft, conveyor means driven from said shaft adapted to travel over the surface of the table, a rocker frame fulcrumed on the said hanger frame, a disc frame connected to the rocker frame and having a vertical movement through the table top, cutting discs mounted in the disc frame, and a driving connection from the said motor to the said discs.

5. In a bread splitting machine, a cutting disc having a scalloped periphery, and smooth opposite sides channeled radially to provide concave channels sufficiently large to bank the air between the disc and the dough to prevent friction and clinging of the dough to the disc.

6. In a bread splitting machine, a cutting disc having a scalloped edge, and a wavy surface on each side face, the cutting edges of the scallops being aligned with each other to extend in a continuous unbroken line.

7. In a bread splitting machine, a disc shaft, laterally adjustable cutting discs thereon, and disc-adjusting means including a differentially threaded bar and disc-moving elements threadedly engaged with the said bar and adapted upon the turning of the bar to move all the said discs simultaneously along the disc shaft.

8. In a bread splitting machine, a series of cutting discs, means for propelling a dough-loaf pan past the cutting discs, and guard discs at each end of the series of cutting discs, said guard discs being slightly larger than the cutting discs and positioned in relation to the pan propelling means so as to just ride on the inside of the outer ends of the pan without displacing the dough-loaf.

9. In a bread splitting machine, a series of cutting discs, guard discs at each end of the series of cutting discs and being slightly larger in diameter than said cutting discs, said guard discs and said cutting discs being adjustable laterally of each other, means for propelling a dough-loaf pan past the said discs, and means for adjusting all of said discs simultaneously and at a speed ratio which centralizes the cutting discs in relation to different sized pans and at the same time so positions the guard discs as to cause them to just ride on the inside of the outer ends of the pan without displacing the dough-loaf.

10. In a bread splitting machine, a disc shaft, a plurality of discs mounted on said shaft so as to be adjustable longitudinally thereof, and means for effecting a quick adjustment of the said discs, said means including a differentially threaded bar parallelling the shaft and having right and left hand groups of threaded sections, the threaded sections of each group being of different pitch, the pitch of similar sections of each group being the same but opposite in direction, and a plurality of disc-moving elements mounted on the said threaded bar and respectively presenting spaced fingers so positioned in relation to a disc as to extend on opposite sides thereof, there being one of such elements threadedly engaged with each threaded section of the said threaded bar.

11. In a bread splitting machine, a horizontal disc shaft having cutter discs thereon, a pair of vertically sliding members having bearings in which the shaft is mounted, slide guides in which the said sliding members are mounted, a horizontal rocker frame fulcrumed at one end and having the said sliding members pivotally connected to its other end, and means for imparting a rocking motion to the said rocker frame.

12. In a bread splitting machine, a horizontal disc shaft having cutting discs thereon, a pair of vertically sliding members between the upper ends of which the said shaft is revolubly mounted, slide guides in which the sliding members are mounted, a horizontal rocker frame fulcrumed at one end for vertical rocking movement and having its other end pivotally supporting the lower ends of the said vertically sliding members, rollers carried by the said rocker frame, and means for raising and lowering the rocker frame including actuating cams upon which the said rollers rest.

13. In a bread splitting machine, a vertically adjustable cutter frame, vertical slide guides in which said frame is mounted, a horizontally pivoted rocker frame having the said cutter frame pivotally connected at one end thereof, vertically adjustable cam followers mounted in said rocker frame, and actuating cams upon which the said adjustable cam followers are adapted to rest.

14. In a bread splitting machine, a vertically adjustable cutter frame, vertical slide guides in which the adjustable cutter frame is mounted, a horizontally pivoted rocker frame below the cutter frame, means for imparting a vertical rocking motion to one end of the said rocker frame, and a knuckle-joint connection between the lower end of the cutter frame and the movable end of the rocker frame.

15. In a bread splitting machine, a disc shaft, a vertically sliding tubular member having a hollow bearing at its upper end in which the disc shaft is mounted, a slide guide in which the tubular member is mounted, a drive shaft extending through the tubular member and having its upper end geared to the disc shaft, a fixed pulley on the lower exposed end of the drive shaft, a driving belt engaged with the pulley, a rocker element having one end fulcrumed for movement about a horizontal pivot and having its other end pivotally connected with the lower end of the vertically sliding tubular member, and means for imparting a vertical rocking movement to the said rocker element.

16. In a bread splitting machine, a table, a pair of vertically sliding members, vertical slide guides fixed to the table with the sliding members mounted therein, a shaft supported between the upper ends of the sliding members, a cross bar connecting the sliding members near their lower ends, a lever pivotally supported on the underside of the table and having a horizontal arm and a vertically depending arm, a catch on the depending arm to engage under the said cross bar in the normal position of the lever, and a roller carried by the said horizontal arm and normally projecting above the surface of the table in advance of the disc shaft.

17. In a bread splitting machine, a table, a vertically adjustable cutter mechanism mounted on said table and extending below the same, a lock member depending from the underside of the table and pivotally mounted to swing in a direction at right angles to the plane of movement of the said cutter mechanism, a catch mounted on said depending member, a balance weight also mounted on the depending member and serving to normally hold the same in a position to engage the catch with the cutter mechanism to prevent downward movement of the latter, and a horizontal member connected with the said depending member and having one end exposed above the surface of the table in advance of the cutter mechanism, said horizontal member being adapted when the said exposed end is depressed by the passage of an object thereover to pivot the depending lock member to disengage the catch from the cutter mechanism.

18. In a bread splitting machine, incision-making means including right and left hand groups of laterally adjustable cutting discs, the discs of each group being adjustable at a relatively different speed ratio, the movement of similar discs of each group being at the same ratio but opposite in direction, and means for adjusting all the discs simultaneously.

In testimony whereof I affix my signature.

JOHN C. FREEMAN.